US009148027B2

(12) United States Patent
Shane et al.

(10) Patent No.: US 9,148,027 B2
(45) Date of Patent: Sep. 29, 2015

(54) METHOD AND SYSTEM FOR CHARGING OF ELECTRIC VEHICLES

(75) Inventors: Conner Brooks Shane, Glenville, NY (US); Roger Lewis Fittro, Niskayuna, NY (US); Harry Kirk Mathews, Jr., Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 483 days.

(21) Appl. No.: 13/561,393

(22) Filed: Jul. 30, 2012

(65) Prior Publication Data
US 2014/0028254 A1 Jan. 30, 2014

(51) Int. Cl.
*H02J 7/00* (2006.01)
*H02J 3/14* (2006.01)
*H02J 13/00* (2006.01)

(52) U.S. Cl.
CPC ............. *H02J 7/0013* (2013.01); *H02J 3/14* (2013.01); *H02J 13/0075* (2013.01); *H02J 7/0027* (2013.01); *H02J 2003/146* (2013.01)

(58) Field of Classification Search
CPC .............................................. H02J 7/11–7/26
USPC ........................................................ 320/109
See application file for complete search history.

(56) References Cited

U.S. PATENT DOCUMENTS

| 5,548,200 | A | 8/1996 | Nor et al. | |
|---|---|---|---|---|
| 6,285,162 | B1 | 9/2001 | Koo | |
| 7,679,336 | B2 | 3/2010 | Gale et al. | |
| 7,911,184 | B2 | 3/2011 | Kohn | |
| 8,013,570 | B2 | 9/2011 | Baxter et al. | |
| 8,103,391 | B2 | 1/2012 | Ferro et al. | |
| 8,116,915 | B2 | 2/2012 | Kempton | |
| 2002/0184078 | A1 | 12/2002 | Uyeki | |
| 2003/0114965 | A1* | 6/2003 | Fiechter et al. | 701/29 |
| 2010/0102776 | A1* | 4/2010 | Uchida | 320/109 |
| 2010/0179893 | A1 | 7/2010 | Burke et al. | |
| 2010/0211340 | A1* | 8/2010 | Lowenthal et al. | 702/63 |

(Continued)

FOREIGN PATENT DOCUMENTS

WO 2011026901 A1 3/2011

OTHER PUBLICATIONS

Sundstrom et al., "Flexible Charging Optimization for Electric Vehicles Considering Distribution Grid Constraints", Smart Grid, IEEE Transactions, IEEE Xplore, Mar. 2012, vol. 3 , Issue:1, pp. 26-37.

(Continued)

*Primary Examiner* — Mohammed Alam
(74) *Attorney, Agent, or Firm* — Jason K. Klindtworth

(57) ABSTRACT

A method for charging plurality of electric vehicles is provided. The method includes determining predicted usage information for the plurality of electric vehicles based on past information for the plurality of vehicles. The predicted usage information, among other information, includes a first total energy needed to be provided to the plurality of vehicles to reach a respective desired state of charge set point. The method further includes optimizing power to be provided to the plurality of vehicles to generate an optimal power requirement plan based on a first cost incurred to charge the vehicles with the first total energy. Furthermore, the method includes scheduling charging of the plurality of vehicles through at least one charging station according to the optimal power requirement plan and a priority associated with each of the plurality of vehicles.

24 Claims, 4 Drawing Sheets

(56) References Cited

U.S. PATENT DOCUMENTS

| | | |
|---|---|---|
| 2011/0043165 A1 | 2/2011 | Kinser et al. |
| 2011/0127944 A1 | 6/2011 | Saito et al. |
| 2011/0191220 A1 | 8/2011 | Kidston et al. |
| 2011/0246252 A1 | 10/2011 | Uesugi |
| 2011/0304304 A1 | 12/2011 | Ankyu |
| 2012/0005126 A1 | 1/2012 | Oh et al. |
| 2012/0019215 A1 | 1/2012 | Wenger et al. |

OTHER PUBLICATIONS

Ashtari et al., "PEV Charging Profile Prediction and Analysis Based on Vehicle Usage Data", Smart Grid, IEEE Transactions, IEEE Xplore, Mar. 2012, vol. 3, Issue:1, pp. 341-350.

* cited by examiner

METHOD AND SYSTEM FOR CHARGING OF ELECTRIC VEHICLES

BACKGROUND

Embodiments of the present invention relate generally to the field of electric vehicles, and specifically, to a method and system for charging electric vehicles.

Growing prices and depleting availability of conventional sources of fuel for vehicles, like petrol, diesel, and natural gas, has given way to the usage of energy storage mechanisms, such as electric batteries, in vehicles. Electric vehicles, as vehicles with energy storage mechanisms are called, are now an important part of the automobile industry with every automobile manufacturer launching electric vehicles.

The electric storage mechanisms, which store energy for the vehicle's consumption, need periodic charging to replenish the charge consumed by the vehicles. Vehicles are generally charged utilizing power generation mechanisms on the vehicle, or charging stations at residences or offices, or on-street charging stations located at public places.

While charging through charging stations, vehicles are plugged in to a charging station/point that is coupled to a power source, such as a utility grid, or a local generator. Charging points/stations are configured to charge an electric vehicle to a state of charge desired by the vehicle user. The charging stations draw power from the power source to provide energy to the vehicles to meet their state of charge requirements. An electric vehicle user thus decides the state of charge she wishes to maintain in the vehicle and charges the vehicle accordingly. Since each vehicle utilizes the charging station individually, available charging station resources are not utilized efficiently, as some vehicles may carry more charge than required and some vehicles may not have enough charge to operate.

Charging management systems, designed to add efficiency to vehicle charging, predict future usage of a vehicle based on past data available from the vehicle to determine the desired state of charge for the vehicle to operate efficiently. Predictive models are designed based on historic usage data for electric vehicles and are provided to charging management systems to determine predicted usage information. The management systems are further configured to transmit charging commands to the charging point/stations to charge the vehicle according to the calculated predicted usage information.

Although the predicted usage information provides important information to the charging station with respect to a single vehicle in isolation, the present day charging management systems do not take into account the change in desired state of charge requirements based on the presence of multiple electric vehicles. The power sources that provide power to the charging stations are, often times, also sources of power to other facilities located in the vicinity of the charging station. Present day charging management systems also do not optimize charging requirements of the vehicles so as to effectively provide charge to all the vehicles to meet at least their minimum requirements and at the same time allow the power source to cater to the power needs of other facilities connected to it.

Existing predictive models also do not take into account a stress in demand felt by power sources when the number of vehicles being charged at charging stations increases. For example, in a densely populated region, a fleet of vehicles being charged at a charging station could lead to greater concentration of power being supplied to the single charging station as opposed to the rest of the region. In similar vein, existing predictive models also do not take into account the stress related to costs felt by charging station providers in making power available for multiple vehicles associated with it.

Hence, there is a need for a method and system for charging of electric vehicles that provides for optimization of resources available with the charging station.

BRIEF DESCRIPTION

In one embodiment, a computer implemented method for charging of electric vehicles is provided. The method includes determining predicted usage information for the plurality of electric vehicles based on past information for each vehicle in the plurality of vehicles. The predicted usage information comprises a total energy i.e. a first total energy needed to be provided to the plurality of vehicles to reach a respective desired state of charge set point. Further, the method includes optimizing power to be provided to the plurality of vehicles to generate an optimal power requirement plan. The optimization of power is based on a cost i.e. a first cost incurred to charge the plurality of vehicles with the total energy. Furthermore, the method includes scheduling charging for the plurality of vehicles through at least one charging station according to the optimal power requirement plan and a priority associated with each of the plurality of vehicles.

In another embodiment, a system for charging of electric vehicles is provided. The system includes at least one charging station to charge the vehicles by providing power and a processing sub-system communicably coupled to the charging station. The processing sub-system further includes a prediction module to generate predicted usage information for the plurality of electric vehicles based on past information for each vehicle in the plurality of vehicles. The predicted usage information for the plurality of vehicles includes a total energy i.e. a first total energy needed to be provided to the plurality of vehicles to reach a respective desired state of charge set point. Further, the processing sub-system also includes an optimization module to optimize the total energy to be provided to the plurality of vehicles to generate an optimal power requirement plan, based on a cost i.e. a first cost incurred to charge the plurality of vehicles by the total energy. The processing sub-system also includes a controller to control a schedule of charging the plurality of vehicles based on the optimal power requirement plan and a priority associated with each of the plurality of vehicles.

In yet another embodiment, a non-transitory computer readable media that causes a processor to execute a method for charging electric vehicles is provided. The non-transitory computer readable media includes program instructions to generate predicted usage information for each vehicle of the plurality of vehicles. The predicted usage information is generated based on past information for each of the plurality of vehicles. The predicted usage information includes a total energy i.e. a first total energy needed to be provided to the plurality of vehicles to reach a respective desired state of charge set point. Further, the computer readable media includes program instructions to optimize the power to be provided to the plurality of vehicles to generate an optimal power requirement plan, based on a cost i.e. a first cost incurred to charge the plurality of vehicles by the total energy. The computer readable media also includes program instructions to control a schedule of charging the plurality of vehicles through at least one charging station according to the optimal power requirement plan and a priority associated with each of the plurality of vehicles.

DRAWINGS

The present invention will be better understood from reading the following description of non-limiting embodiments, with reference to the attached drawings, wherein below:

DETAILED DESCRIPTION

Figure 1:
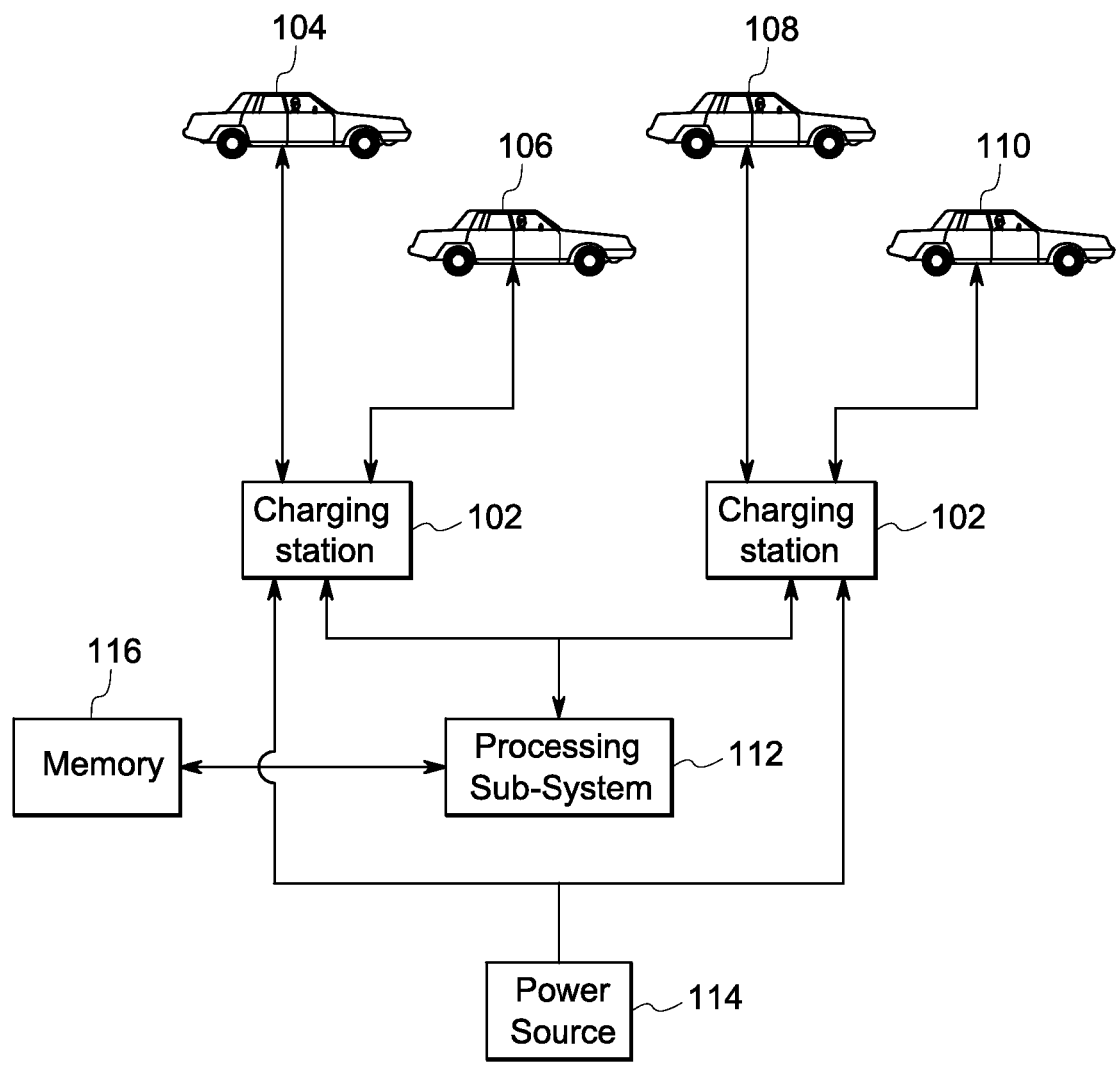
FIG. 1 illustrates an exemplary embodiment of an environment in which the present invention is practiced.

Reference will be made herein to exemplary embodiments of the invention, examples of which are illustrated in the accompanying drawings. Wherever possible, the same reference numerals used throughout the drawings refer to the same or like parts.

Embodiments described herein relate to a method and system of charging electric vehicles. Electric vehicles that require energy for their daily operations are connected to charging stations to draw energy required to achieve their respective desired states of charge. The charging stations are in turn connected to power sources that provide power to the charging station so as to charge the electric vehicles. The method of charging vehicles, which will be described in greater detail in the following paragraphs, includes determining predicted usage information for the plurality of electric vehicles based on past information for each of the plurality of vehicles. The predicted usage information, produced from such past information, includes the predicted distance to be covered by each of the plurality of vehicles in a defined time period, the cost of power generated by the power source within the defined time period, and a total energy needed to be provided to the plurality of vehicles to allow each of the vehicles to reach a respective desired state of charge set point. Further, in the method, the power to be provided to the plurality of vehicles is optimized based on a cost incurred to provide the vehicles with the total energy needed to be provided to the plurality of vehicles to allow each of the vehicles to reach the respective desired state of charge set point. The optimization in carried out to reduce the cost incurred to provide the vehicles with the energy required to be stored in the energy storage mechanisms for their daily operations. Optimization results in generation of an optimized power requirement plan that details optimal power to be provided to each of the vehicles to meet their predicted usage information. Further, charging is scheduled for each of the plurality of vehicles based on the optimal power requirement plan and a priority associated with each of the vehicles. The optimal power requirement plan also may be updated while the vehicles are being charged for reasons that include, for example, a change in planned distance coverage for a vehicle, an unplanned vehicle maintenance scheduled, and demand of the vehicle being higher than the power available for charging. The updated optimal power requirement plan is generated again and provided to the charging station that charges the vehicles according to the plan. The foregoing is described in greater detail in the subsequent paragraphs with the help of accompanied drawings.

FIG. 1 illustrates an exemplary embodiment of an exemplary environment 100 in which the present technique is practiced. The environment 100 includes at least one charging station 102, a plurality of electric vehicles 104, 106, 108, and 110, and a processing sub-system 112. In various embodiments, the charging station 102 is located at sites such as residences, offices, commercial or industrial parking lots, and warehouses. For example, for a freight delivery service provider, the charging station 102 may be located at a base parking area for vehicles operated by the freight delivery service provider. The term "vehicles" refers to machines for carrying passengers, cargo, or equipment. The plurality of electric vehicles 104, 106, 108, and 110, may represent automobiles, buses, trucks, equipment carrier trucks, aircrafts, ships, and baggage handling equipment in warehouses, or airports, or dockyards, for example. Each of the plurality of electric vehicles 104, 106, 108, and 110 includes, among other propulsion or drive components of a vehicle, a chargeable energy storage mechanism such as a battery to power the propulsion components.

The charging stations 102 may be electrically coupled with a power source 114, such as a utility grid or a power generator local to the charging stations 102, to draw power required to provide energy to charge the electric vehicles 104, 106, 108, and 110. Further, the plurality of electric vehicles 104, 106, 108, and 110 are configured to receive a charging signal from the charging station 102 to enable charging of the energy storage mechanism. The charging signal may be delivered through a physical adaptor such as a plug or wirelessly through one or more mechanisms designed to inductively couple the vehicles 104, 106, 108, and 110 to the charging station. The electric vehicles 104, 106, 108, and 110 are typically charged based on input from a vehicle operator. The vehicle operator may want to charge the vehicle to the full capacity of the vehicle's energy storage mechanism or the operator may want to charge the vehicle based on the cost of charging the vehicle. For example, the cost of charging the vehicles 104, 106, 108, and 110 may depend on the cost of power provided by the power source 114 and may increase as the amount of energy required to charge the vehicles 104, 106, 108, and 110 increases. Further, the vehicles 104, 106, 108, and 110 are also communicably coupled with the charging stations 102 through a wired/wireless communication channel to communicate energy storage mechanism status and also to communicate usage information pertaining to the vehicles 104, 106, 108, and 110. The communication channels between the vehicles 104, 106, 108, and 110 and the charging stations 102 may include, but are not limited to, coaxial cables, fiber optic cables, Bluetooth™, Wi-Fi™ WiMAX®, General Packet for Radio Service (GPRS), Global System for Communications (GSM), Near Field communication channels, Radio Frequency Identification (RFID) communication channels, and personal area network communication channels such as Zigbee®.

Further, the environment 100 includes a processing sub-system 112 that is configured to control energy transfer between the power source and the charging station 102. The processing sub-system 112 is also configured to operate as a charge management system to manage charging of vehicles 104, 106, 108, and 110 by controlling energy provided by the charging stations 102 to the vehicles 104, 106, 108, and 110. The processing sub-system 112, in some embodiments, is configured to manage vehicle charging by estimating predicted usage information for each of the vehicles 104, 106, 108, and 110 based on past information for each vehicle. The processing sub-system 112 is communicably coupled with the charging stations 102, and the vehicles 104, 106, 108, and 110 through wired or wireless communication channels.

The processing sub-system 112, in certain embodiments, may comprise a central processing unit (CPU) such as a microprocessor, or may comprise any suitable number of application specific integrated circuits working in cooperation to accomplish the functions of a CPU. The processing sub-system 112 may include a memory 116. The memory 116 can be an electronic, a magnetic, an optical, an electromagnetic, or an infrared system, apparatus, or device. Common forms of memory 116 include hard disks, magnetic tape, Random Access Memory (RAM), a Programmable Read Only Memory (PROM), and EEPROM, or an optical storage device such as a re-writeable CDROM or DVD, for example. The processing sub-system 112 is capable of executing program instructions, related to the system for charging electric vehicles that are stored in the memory 116, and functioning in response to those instructions or other activities that may occur in the course of charging the vehicles 104, 106, 108, and 110. Such program instructions will comprise a listing of executable instructions for implementing logical functions. The listing can be embodied in any computer-readable medium for use by or in connection with a computer-based system that can retrieve, process, and execute the instructions. Alternatively, some or all of the processing may be performed remotely by additional processing sub-systems 112.

According to certain embodiments, the processing sub-system 112 may be located at a remote facility in direct communication with the charging stations 102. The processing sub-system 112 may be a part of the computer infrastructure of the vehicle operator and may be utilized to communicate with the charging stations 102. Further, the operations of the processing sub-system 112 may be distributed to computer nodes across the computer infrastructure, for fast processing of data.

In present day charge management systems, the past information may include past information regarding distances traveled by the vehicles 104, 106, 108, and 110 in a desired time period. For example, the distance covered by each of the vehicles 104, 106, 108, and 110 in 24 hours for all days of a year may be utilized by the charge management systems to determine the predicted usage information. The past information may also include the charge consumed by each of the vehicles 104, 106, 108, and 110 in the desired time period. For example, past information may include a state of charge for the energy storage mechanism of each of the vehicles at the start of every business day and the state of charge for the energy storage mechanism at the end of every business day, for all days of the year. Based on such past information, present day charge management systems are configured to calculate the predicted usage information for each of the plurality of vehicles 104, 106, 108, and 110. The predicted usage information, according to certain embodiments, may include a predicted distance to be covered by each of the vehicles 104, 106, 108, and 110 in the desired time period, or the predicted energy to be consumed by each of the vehicles 104, 106, 108, and 110 in the desired time period. The processing sub-system 112 is further configured to transmit charging commands to the charging stations 102. The charging stations 102 charge each of the vehicles 104, 106, 108, and 110 based on the charging commands received from the processing sub-system 112 to satisfy the vehicles' 104, 106, 108, and 110 energy requirements.

Past information utilized by the processing sub-system 112 to generate the predicted usage information may be stored in a vehicle information repository (not shown) that is communicably coupled with the processing sub-system 112. The vehicle information repository may be located remote to the processing sub-system 112 and may be in communication with the processing sub-system 112 through wired/wireless communication channels.

Figure 2:
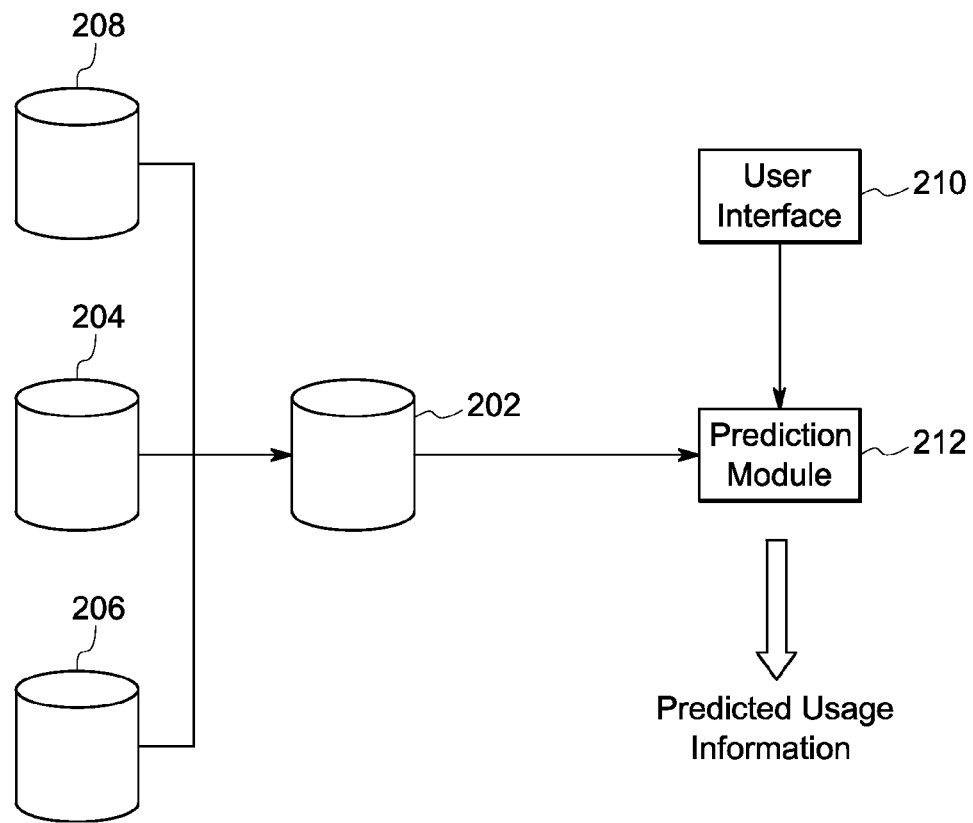
FIG. 2 illustrates a block diagram of a system to determine of predicted usage information for a plurality of electric vehicles.

According to embodiments of the present technique, the processing sub-system 112 includes a prediction module, described in greater detail in FIG. 2, to generate the predicted usage information that may be needed to generate an optimal power requirement plan for the vehicles 104, 106, 108, and 110.

FIG. 2 illustrates a block diagram of a system to determine predicted usage information for a vehicle from a fleet of electric vehicles, in accordance with one embodiment. In the illustrated embodiment, the system for the determination of predicted usage information includes a data repository 202, a weather update repository 204, a power source information repository 206, a vehicle information repository 208, a user interface 210, and a prediction module 212. The data repository 202 is communicably coupled with the weather update repository 204, the power source information repository 206, and the vehicle information repository 208.

In some embodiments, the past information is transmitted to the data repository 202 individually by each vehicle 104, 106, 108, and 110 through an on-board transmitter located on the vehicles 104, 106, 108, and 110. The data repository 202 and the on-board transmitters utilize communication channels between the transmitters and the data repository 202 (via intermediate repeaters or communication nodes as necessary) for data transfer. The on-board transmitter is communicably coupled with different components of the vehicles 104, 106, 108, and 110, such as an energy storage mechanism, and an odometer located on the vehicles 104, 106, 108, and 110. In other embodiments, the vehicles 104, 106, 108, and 110 are in communication with the processing sub-system 112 through the charging stations 102. The charging stations 102 may receive the past information from the vehicles 104, 106, 108, and 110 and transmit this information to the processing sub-system 112 through the communication channels between the charging stations 102 and the processing sub-system 112.

The vehicle, weather, and power source past information, according to some other embodiments, may also be transmitted to the data repository 202 via a user interface 210 available to an operator. The information may be collected by the operator through various data repositories and entered into the data repository 202 through the user interface 210. In some embodiments, the vehicle, weather, and power source past information may be provided from a single data store that is communicably coupled with the prediction module 212. The past information may also be provided through distributed data stores located across a network of processing sub-systems at the operator site.

According to certain embodiments, the vehicle information repository 208 provides the data repository 202 with past information related to the vehicles 104, 106, 108, and 110. The vehicle information repository 208 includes past information such as, but not limited to, past destinations and past origins of vehicles 104, 106, 108, and 110 over the defined time period, past distances covered by the vehicles 104, 106, 108, and 110 in the defined period, past maintenance activities carried out on the vehicles 104, 106, 108, and 110, and past information about the date of manufacture of energy storage mechanisms in the vehicles 104, 106, 108, and 110.

The power source information repository 206 provides the data repository 202 with past information pertaining to the power source 114 connected with the charging stations 102. The information from the power source information repository 206 may include, but is not limited to, past data related to the amount of power supplied by the power source 114 to the site of the charging stations 102, past data related to power consumed by the charging station 102 in the defined time period, power consumed by other facilities located at the site of the charging station 102 in the defined time period, and past data related to cost of power generated by the power source 114. The operator of power source 114, for example a utility service provider, may be communicably coupled with the prediction module 212 in the processing sub-system 112 to provide past information of the power source at the site of the charging stations 102. The power source 114 may provide periodic past information updates to the power source information repository 206 that can then be transmitted to the data repository 202. Alternatively, the power source 114 may provide periodic past information updates directly to the data repository 202. Energy consumption sources in the other facilities at the site of the charging stations 102 may also be communicably coupled to either the power source information repository 206 or the data repository 202 to provide their past information. The past cost of power generated at the power source 114 information may also be provided by the power source 114 operator through periodic updates to the power source information repository 206.

The weather information repository 208 provides the data repository 202 with past information pertaining to weather conditions at locations of operation of the vehicles 104, 106, 108, and 110. The weather information repository 208 transmits weather conditions experienced by each of the vehicles 104, 106, 108, and 110 including weather conditions at the origin of the vehicles 104, 106, 108, and 110, the destination of the vehicles 104, 106, 108, and 110, and for the route between the origin and the destination. Different weather conditions encountered by the vehicles 104, 106, 108, and 110 lead to a change in a rate of consumption of energy stored in the energy storage mechanism. For example, the vehicles 104, 106, 108, and 110 may need to utilize temperature management systems in the vehicles when the weather conditions are hot or humid. The temperature management systems, for operation, may consume additional energy from the energy storage mechanism and lead to a faster discharge of the energy storage mechanism. Such information may be utilized by the prediction module 212 to generate the predicted usage information for the plurality of vehicles 104, 106, 108, and 110.

The prediction module 212 receives information from the data repository 202 with respect to each of the plurality of vehicles 104, 106, 108, and 110, the weather conditions encountered by the plurality of vehicles 104, 106, 108, and 110 and power consumption experienced by the power source 114. The prediction module 212 is configured to generate predicted usage information for the plurality of vehicles 104, 106, 108, and 110 from such past information. The predicted usage information, according to one embodiment, includes the total energy needed to be provided to the plurality of vehicles to charge each of the plurality of vehicles 104, 106, 108, and 110 to a respective desired state of charge set point for the respective energy storage mechanisms. The total energy needed to charge the vehicles 104, 106, 108, and 110 to the desired state of charge set point is the sum of energy provided to each of the vehicles to reach the desired state of charge set point for each respective energy storage mechanism. The desired state of charge set point for each vehicle may be provided by vehicle operators through the user interface 210 and may vary from one vehicle to the next. According to some embodiments, the desired state of charge set point for each of the plurality of vehicles 104, 106, 108, and 110 is the maximum amount of energy that can be stored in a given energy storage mechanism.

The predicted usage information generated by the prediction module 212 may also include at least one of energy consumed by each of the plurality of vehicles 104, 106, 108, and 110 within the defined time period, the state of charge of the energy storage mechanism for each of the plurality of vehicles 104, 106, 108, and 110 after the defined time period, the predicted distance covered by each of the plurality of vehicles 104, 106, 108, and 110 within the defined time period (such as an average distance covered by each of the plurality of vehicles or a maximum distance covered by each of the plurality of vehicles 104, 106, 108, and 110 within the defined time period), the cost of power after the defined time period, an amount of time that each of the plurality of vehicles 104, 106, 108, and 110 is coupled to the charging stations 102, a total amount of time required to provide the total energy to the plurality of vehicles 104, 106, 108, and 110 to reach a desired state of charge set point, and an amount of power available at the charging stations 102 for charging the plurality of vehicles 104, 106, 108, and 110.

The prediction module 212 uses known techniques such as statistical, probabilistic, and inferential/learning-based data modeling techniques to generate the predicted usage information from the past information. In certain embodiments, each of the data modeling techniques can be used to determine predicted information pertaining to the usage of vehicles 104, 106, 108, and 110, weather conditions expected by the plurality of vehicles 104, 106, 108, and 110, and the power load expected by the power source 114. In certain other embodiments, a combination of known data modeling techniques can be used by the prediction module 212 to generate the predicted usage information.

In one embodiment, the vehicle usage information received from the vehicle information repository 208 may be utilized by the prediction module 212 to generate a statistical model pertaining to past information about distances covered by each of the vehicles 104, 106, 108, and 110. The statistical model, based on a trend observed in the past information presented to the prediction module 212, may be utilized to calculate the distance expected to be covered by each of the vehicles 104, 106, 108, and 110 within the defined time period. For example, the statistical model generated by the prediction module 212 may determine that vehicle 104 from the vehicles 104, 106, 108, and 110 typically covers a distance of 50 miles per day. The predicted distance to be covered by the vehicle 104, in such a case, may be 50 miles per day. The statistical model may be generated by the prediction module 212 for each vehicle 104, 106, 108, and 110 and utilized to predict the distance to be covered by each vehicle. In other embodiments, the prediction module 212, may determine a maximum value of past distances covered by the vehicle 104 from the vehicles 104, 106, 108, and 110 and hence use that value as a predicted maximum distance covered by the vehicle 104. Similarly, the prediction module 212 may utilize statistical data modeling techniques to determine one or more of the predicted energy consumed by each of the plurality of vehicles 104, 106, 108, and 110 within the defined time period, the predicted state of charge of the energy storage mechanism for each of the plurality of vehicles 104, 106, 108, and 110 after the defined time period, and a time that each of the plurality of vehicles 104, 106, 108, and 110 is available to be charged at the charging stations 102.

In one embodiment, the weather information received from the weather information repository 206 may be utilized by the prediction module 212 to generate a model pertaining to weather conditions at the past destinations and origins of each of the plurality of vehicles 104, 106, 108, and 110. The weather models generated for locations relevant to the vehicles 104, 106, 108, and 110 in a future time period are utilized to determine the predicted weather conditions for each vehicle. The predicted usage information determined by the prediction module 212 from the vehicle usage information and the weather information obtained from the data repository 202 may be utilized to determine the total energy to be provided to each of the vehicles 104, 106, 108, and 110 to reach each vehicle's the desired state of charge set point. The total energy needed to be provided to the plurality of vehicles to reach the desired state of charge set point for each vehicle 104, 106, 108, and 110 may be determined by performing an arithmetic operation, such as addition, on the predicted amount of energy to be provided to each of the vehicles 104, 106, 108, and 110 to cover the predicted distance to be covered by each of the vehicles 104, 106, 108, and 110.

Further, according to one embodiment, the prediction module 212 may develop probabilistic models to determine the predicted cost of power at the power source 114 when the vehicles 104, 106, 108, and 110 are predicted to arrive at the charging stations 102 for charging. The probabilistic models may be based on past information received from the power source information repository 206, for example. The past information from the power source information repository 206 may include the past cost of raw material required to generate power from the power source 114. Further, the past information may also include other external factors that may influence the cost of power provided by the power source 114. The prediction module 212 utilizes a probabilistic model to generate a relationship between the past cost of raw material and the external factors influencing the cost of power provided by the power source 114. The probabilistic model is utilized to determine the predicted cost of power provided by the power source 114 after the defined time period.

The prediction module 212 also utilizes the information from the power source information repository 206 to determine predicted power usage by other facilities located at the site of the charging station 102, a total amount of time required to provide the total energy to the plurality of vehicles 104, 106, 108, and 110 to reach a desired state of charge set point, and an amount of power available with the charging stations 102 for charging the plurality of vehicles 104, 106, 108, and 110.

The prediction module 212 provides the predicted usage information to the optimization module (see e.g., 302 in FIG. 3) of the processing sub-system 112 to optimize the power to be provided to the plurality of vehicles 104, 106, 108, and 110 to generate an optimal power requirement plan. The optimization module is configured to generate the optimal power requirement plan based on the cost incurred to charge the plurality of vehicles 104, 106, 108, and 110 with total energy needed to charge the vehicles 104, 106, 108, and 110 to the desired state of charge set point for each vehicle.

Figure 3:
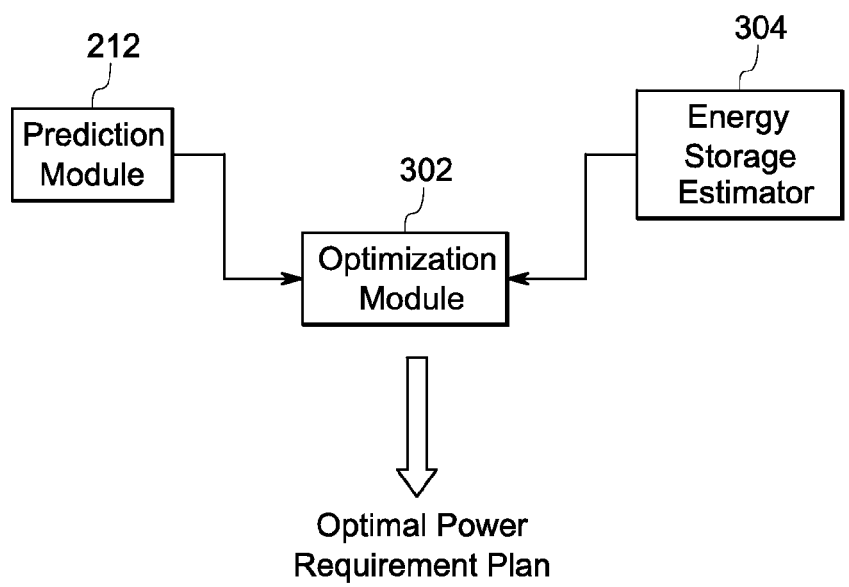
FIG. 3 illustrates a block diagram of a system to generate an optimal power requirement plan for the plurality of vehicles.

FIG. 3 illustrates a block diagram of a system to generate an optimal power requirement plan for the fleet of vehicles, in accordance with one embodiment. The system to generate the optimal power requirement plan includes the prediction module 212, the optimization module 302, and an energy storage estimator 304. The optimization module 302 is configured to generate the optimal power requirement plan based on the cost incurred by the charging stations 102 to provide the plurality of vehicles 104, 106, 108, and 110 with the total energy needed to reach the desired state of charge set point for each vehicle 104, 106, 108, and 110. The total energy needed to reach the desired state of charge set point for each vehicle 104, 106, 108, and 110 may be calculated based on the energy required to charge each vehicle from a current state of charge of each energy storage mechanism to the maximum amount of energy that can be stored in each energy storage mechanism. To generate the optimal power requirement plan, the optimization module 302 is configured to determine an amount of energy required by each of the plurality of vehicles 104, 106, 108, and 110 to cover at least the predicted distance to be covered by each of the plurality of vehicles 104, 106, 108, and 110. The predicted distance to be covered by each of the vehicles 104, 106, 108, and 110, in certain embodiments, may be at least one of the predicted average distance covered by each of the plurality of vehicles 104, 106, 108, and 110, and the predicted maximum distance to be covered by each of the plurality of vehicles 104, 106, 108, and 110. Further, the optimization module 302 is configured to iteratively adjust an amount of energy to be provided to the plurality of vehicles 104, 106, 108, and 110 to reach the respective desired state of charge set point such that the amount of energy to be provided to the vehicles 104, 106, 108, and 110 is greater than or equal to the amount of energy required to cover at least the predicted distance for each vehicle 104, 106, 108, and 110. Further, the amount of energy to be provided to each vehicle 104, 106, 108, and 110 is also adjusted such that the cost incurred to provide each of the vehicles with that amount of energy is less than the cost incurred to charge each of the vehicles to the desired state of charge set point.

The optimal power requirement plan thus generated may include energy to be provided to each of the plurality of vehicles 104, 106, 108, and 110 such that each vehicle has energy to cover at least the respective predicted distances.

In other embodiments, a transmitter located at the site of installation of the charging stations 102 may be configured to communicate an arrival of the vehicles 104, 106, 108, and 110 after the defined time period to the processing sub-system 112. The processing sub-system 112 may be configured to communicate this arrival information to the optimization module 302 to modify the optimal power requirement plan. The optimization module 302 may determine the absence of some vehicles from the vehicles 104, 106, 108, and 110 predicted to arrive at the charging stations 102 after the defined time period. The modified optimal power requirement plan, according to certain embodiments, may take into account the reduction in the number of vehicles from the plurality of vehicles 104, 106, 108, and 110 that may be charged at the charging stations 102 and may modify the optimal power requirement plan to provide the vehicles present at the charging station with more energy than they may require to cover each predicted distance.

Further, in one embodiment, when at least one of the vehicles 104, 106, 108, and 110 is plugged in to the charging stations 102, the charging stations 102 communicate this information to the processing sub-system 112. The processing sub-system communicates the "plugged-in" information to the energy storage estimator 304 that may determine an estimated state of charge of the energy storage mechanism at each of the vehicles 104, 106, 108, and 110 based on an energy storage mechanism model. According to certain embodiments, the energy storage mechanism model for a particular energy storage mechanism may be a relationship model between the amount of power consumed by the charging stations 102 to provide a certain amount of energy to the energy storage mechanism and the state of charge of the energy storage mechanism. According to some embodiments, the energy storage estimator 304 utilizes known estimation techniques such as maximum likelihood method, Monte Carlo method, Kalman Filter, Extended Kalman Filter, and Bayes action method to establish the aforementioned relationship and determine the estimated state of charge of the energy storage mechanism. The estimated state of charge is further communicated to the optimization module 302. The optimization module 302 may also take into account the estimated state of charge of the energy storage mechanism for the vehicles after an actual arrival time of the vehicles to determine the amount of power to be provided to the vehicles 104, 106, 108, and 110 that is greater than or equal to the amount of power required by the vehicles 104, 106, 108, and 110 to cover at least the predicted distance. Further, the amount of energy to be provided to each vehicle 104, 106, 108, and 110 is also adjusted such that the cost incurred to provide each of the vehicles with that amount of energy is less than the cost incurred to charge each of the vehicles to the desired state of charge set point.

The optimization module 302 may also be configured to receive inputs from the operator via the user interface 210. The operator may provide information such as the price of energy after the defined time period, the availability/non-availability of vehicles at the site of charging stations 102, and the current state of charge of each of the plurality of vehicles 104, 106, 108, and 110. The optimization module 302 may utilize the operator provided information along with the predicted usage information from the prediction module 212 and the estimated state of charge information provided by the energy storage estimator 304 to generate the optimal power requirement plan.

Figure 4:
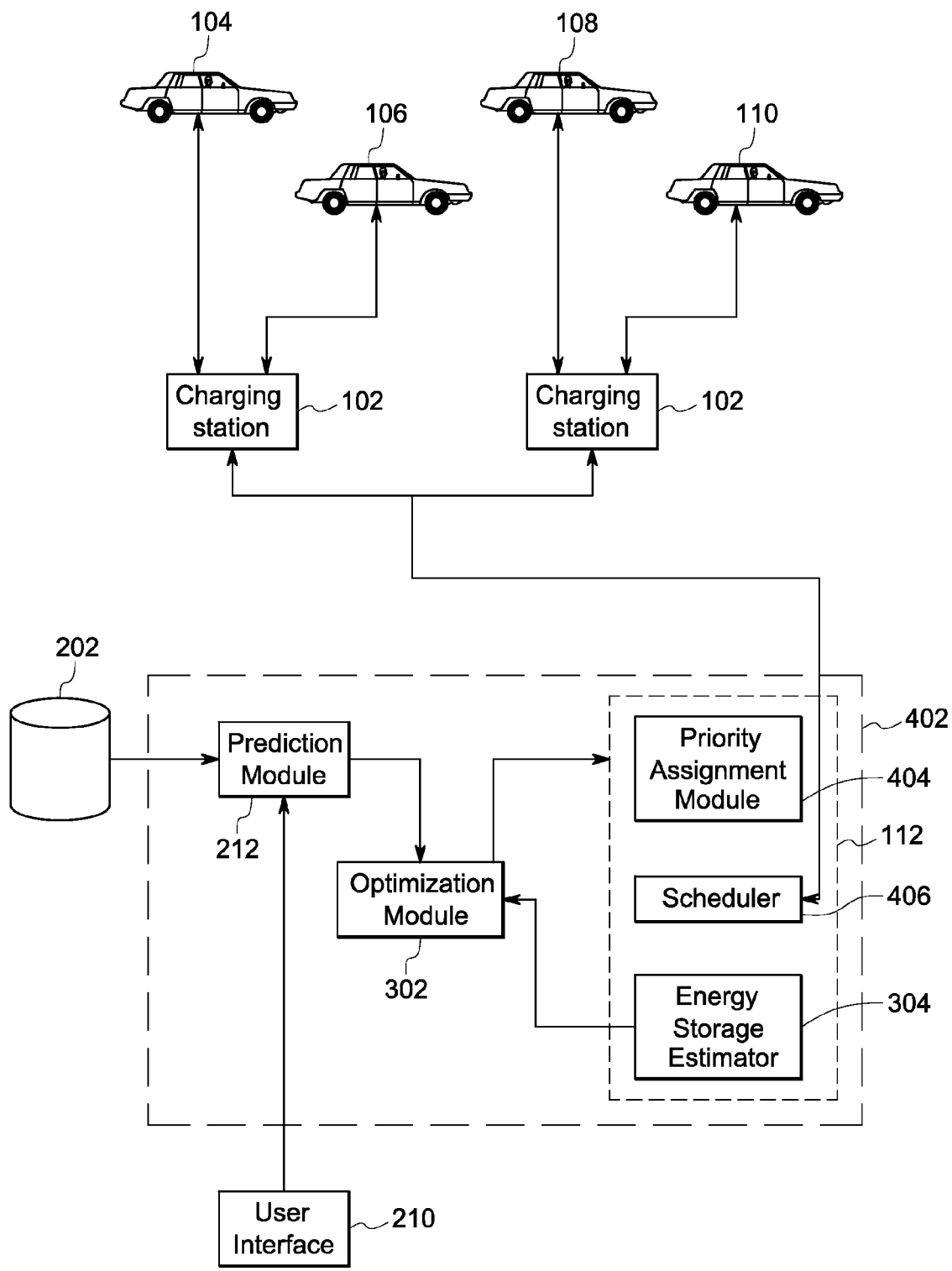
FIG. 4 illustrates a block diagram of a system for charging of the plurality of vehicles.

The optimization module 302 communicates the optimal power requirement plan to a controller (see e.g., controller 402 in FIG. 4). According to certain embodiments, the controller is configured to control a schedule of charging for the plurality of vehicles 104, 106, 108, and 110 based on the optimal power requirement plan and a priority assigned to each of the plurality of vehicles 104, 106, 108, and 110.

FIG. 4 illustrates an exemplary embodiment of a system for charging electric vehicles. The system includes the processing sub-system 112, the data repository 202, and the user interface 210 along with charging stations 102 and the plurality of vehicles 104, 106, 108, and 110. The processing sub-system 112 further includes the prediction module 212, the optimization module 302, and the controller 402. The controller 402 is configured to control the schedule of charging of the plurality of vehicles 104, 106, 108, and 110 based on the optimal power requirement plan and priority associated with each of the plurality of vehicles 104, 106, 108, and 110. The controller 402 further includes the energy storage estimator 304, a priority assignment module 404, and a scheduler 406. The energy storage estimator 304 is communicably coupled with the optimization module 302 to provide the estimated state of each energy storage mechanism for the vehicles 104, 106, 108, and 110 to modify the optimal power requirement plan.

According to certain embodiments, the priority assignment module 404 is configured to assign charging priorities to each of the plurality of vehicles 104, 106, 108, and 110. In order to assign priorities, the priority assignment module 404 may be configured to calculate a comparison metric for each vehicle. The comparison metric may be based on an amount of time required to charge the respective energy storage mechanism with the amount of energy to be provided to the vehicle and the time available with the charging stations 102 to charge the energy storage mechanisms of all of the plurality of vehicles 104, 106, 108, and 110. For example, for vehicle 104, the amount of time required to charge the energy storage mechanism with the amount of energy to be provided to the vehicle 104 may be 60 minutes, whereas the time available with the charging stations 102 to charge all the vehicles 104, 106, 108, and 110 may be 90 minutes. The comparison metric establishes a relationship between these times for each of the plurality of vehicles 104, 106, 108, and 110. The comparison metric that establishes this relationship may be a ratio of the aforementioned time values, or the difference of the aforementioned time values. For example, for the vehicle 104 the comparison metric may either be a ratio (e.g., 60 min/90 min=2/3) or a difference (e.g., 60 min−90 min=−30). The priority assignment module 404 may be configured to assign the highest priority to the vehicle that has the highest comparison metric among the plurality of vehicles 104, 106, 108, and 110. When the comparison metric is the difference between the time required to provide the amount of energy and the time available with the charging stations 102 to charge, the vehicle with the comparison metric closest to 0 is assigned the highest value. The priority assignment module 404 is configured to exclude those vehicles for which the ratio comparison metric is greater than 1 or for which the difference comparison metric is greater than 0. When the ratio comparison is greater than 1, the time required to charge the vehicle with the amount of energy to be provided is greater than time available with the charging stations 102 to charge all the vehicles 104, 106, 108, and 110. Thus, the priority assignment module 404 may determine that it may not be possible to charge a vehicle that needs more time to get charged in comparison with the time available with the charging stations 102 to charge all the vehicles. The priority assignment module 404 may communicate to the scheduler 406 to exclude such vehicles from charging and may assign priority to the remaining vehicles in decreasing order of the ratio comparison metric for the remaining vehicles. Similarly, when the difference comparison metric is greater than 0 the time required to charge the vehicle with the amount of energy to be provided is greater than time available with the charging stations 102 to charge all the vehicles 104, 106, 108, and 110.

In certain embodiments, the operator may utilize the user interface 210 to communicate to the processing sub-system 112 a priority to each of the plurality of vehicles 104, 106, 108, and 110. The processing sub-system transmits the priority information received from the operator to the priority assignment module 404.

The priority assignment module 404 may communicate the determined priority assignment to the scheduler 406 to schedule charging of the vehicles 104, 106, 108, and 110. The scheduler 406 may be communicably coupled with the charging stations 102 to transmit charging commands to the charging stations 102 in accordance with the optimal power requirement plan and the priority assigned to the vehicles 104, 106, 108, and 110 by the priority assignment module 404.

Figure 5:
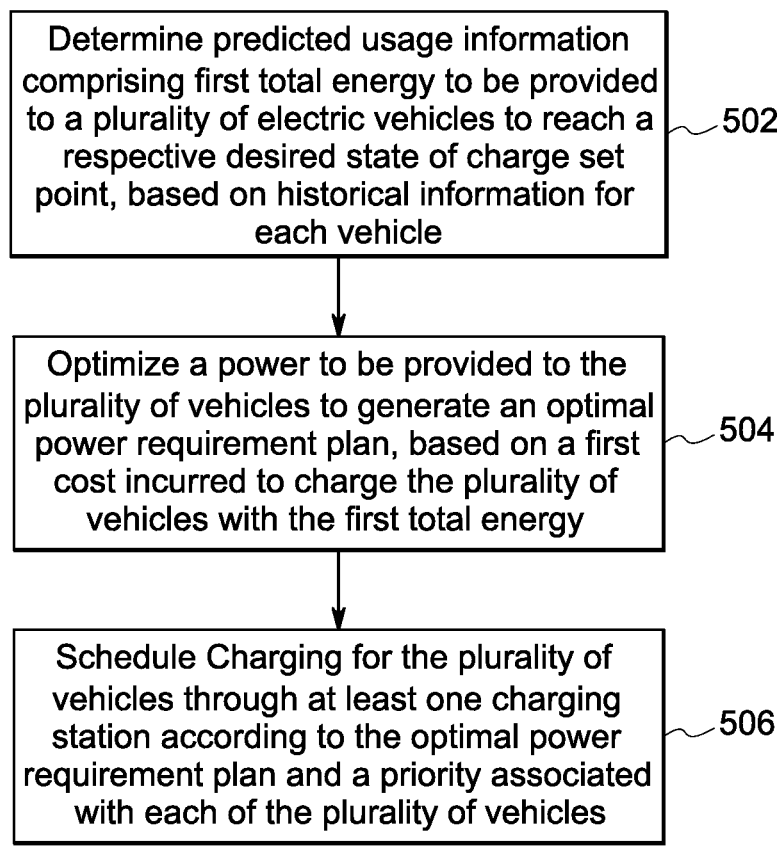
FIG. 5 illustrates a flow diagram of a method for charging of the plurality of electric vehicles.

FIG. 5 illustrates a flow diagram for a method for charging the plurality of electric vehicles 104, 106, 108, and 110. At step 502, the prediction module 212 determines predicted usage information for each of the plurality of electric vehicles 104, 106, 108, and 110 based on past information. The past information is provided by the vehicle information repository 208, the weather information repository 204, and the power source information repository 206, for example. The predicted usage information includes the total energy needed to charge each of the plurality of vehicles 104, 106, 108, and 110 to the respective desired state of charge set point. The total energy needed to reach the desired state of charge set point for each vehicle 104, 106, 108, and 110 may be calculated based on the energy required to charge each vehicle from a current state of charge of each energy storage mechanism to the maximum amount of energy that can be stored in each energy storage mechanism. At step 504, power to be provided to the plurality of vehicles 104, 106, 108, and 110 is optimized to generate the optimal power requirement plan. For example, the optimization module 302 optimizes the power to be provided based on the cost incurred to provide the total energy required to charge each of the plurality of vehicles 104, 106, 108, and 110 to the respective desired state of charge set point. At 506, charging for the plurality of vehicles 104, 106, 108, and 110 through the charging stations 102 is scheduled according to the optimal power requirement plan and priority assigned to each of the plurality of vehicles 104, 106, 108, and 110 by the priority assignment module 404.

According to certain embodiments, the predicted usage information may be generated based on information provided by the operator through the user interface 210. The predicted usage information generated by the prediction module 212 may include energy consumed by each of the plurality of vehicles over the defined time period, the state of charge of each of the plurality of vehicles after the defined time period, the predicted distance covered by each of the plurality of vehicles within the defined time period, the cost of power generated by the power source, and the predicted power consumption by other facilities at the site of the charging stations 102. This predicted usage information is utilized to calculate the total energy needed to be provided each of to the plurality of vehicles 104, 106, 108, and 110 to reach the respective desired state of charge set point, and the cost incurred to the total energy required to charge each of the plurality of vehicles 104, 106, 108, and 110 to the respective desired state of charge set point.

Further, while optimizing power to be provided to the plurality of vehicles 104, 106, 108, and 110, an amount of energy required by each of the plurality of vehicles 104, 106, 108, and 110 to cover at least the predicted distance is determined. Further, during optimization, the amount of energy to be provided to each of the plurality of vehicles 104, 106, 108, and 110 is adjusted such that the amount of energy to be provided is greater than or equal to the amount of energy required to cover at least the predicted distance and a cost incurred to charge the vehicles with the amount of energy to be provided is less than the cost incurred to charge the vehicles 104, 106, 108, and 110 with the total energy required to reach the desired state of charge set point for each vehicle 104, 106, 108, and 110.

The optimal power requirement plan may be modified based on estimated state of charge for each vehicle that arrives at the site after the defined time period. The optimal power requirement plan may also be modified based on the availability/absence of certain vehicles from the plurality of vehicles 104, 106, 108, and 110.

The schedule of charging for the vehicles 104, 106, 108, and 110 is controlled based on the optimal power requirement plan and charging priorities assigned to the plurality of vehicles 104, 106, 108, and 110. The priorities are assigned to the plurality of vehicles based on comparison metrics determined for each of the plurality of vehicles. Further, according to certain embodiments, charging commands according to the optimal power requirement plan and the priority may be communicated to the charging stations 102 through the communication channels established between the processing sub-system 112 and the charging stations 102.

In an exemplary embodiment, the vehicles 104, 106, 108, and 110 may be vehicles owned by freight services operator. The vehicles 104, 106, 108, and 110 may be utilized to deliver cargo to recipients according to their expected time of delivery. The freight services operator may employ route management systems to plan trips for each of these vehicles. The vehicles, typically, leave a warehouse of the operator and are expected to be parked back at the warehouse at end of business hours. The aforementioned system for charging vehicles 104, 106, 108, and 110 may be utilized to charge the vehicles 104, 106, 108, and 110 through the charging stations 102 installed at the warehouse. The prediction module 212, a part of the processing sub-system 112 of the system, receives past information pertaining to the vehicles 104, 106, 108, and 110, weather conditions encountered by the vehicles 104, 106, 108, and 110, and the power source 114 from at least one of the data repository 202, and the user interface 210. Based on the received information, the prediction module 212 may predict information such as the usage of each of the vehicles 104, 106, 108, and 110, cost of power required to charge the vehicles 104, 106, 108, and 110 before start of business hours, time required by the charging stations 102 to charge each of the plurality of vehicles 104, 106, 108, and 110 to the desired state of charge set point, and power requirements by facilities located at the warehouse. The prediction module 212 may also be configured to determine the total energy required to charge each of the plurality of vehicles 104, 106, 108, and 110 to reach their respective desired state of charge set point. For example, each vehicle 104, 106, 108, and 110 may consume different amounts of energy within the defined time period. The desired state of charge set point for each vehicle may be the maximum energy that can be stored in each energy storage mechanism. The total energy needed to be provided to the vehicles 104, 106, 108, and 110 to reach the respective desired state of charge set point would then be the amount of energy required to bring the state of charge from current levels to the maximum energy storage state of charge. Further, the optimization module 302 from the processing sub-system 112 is configured to optimize the power to be provided to the plurality of vehicles 104, 106, 108, and 110 to generate the optimal power requirement plan. The optimization module 302 may optimize the power to be provided to the plurality of vehicles 104, 106, 108, and 110 based on the cost incurred to provide the total energy to the plurality of vehicles 104, 106, 108, and 110 to reach the respective desired state of charge set point. The optimization module 302 is configured to optimize the power in such a way that the cost of charging the plurality of vehicles is low while enabling the plurality of vehicles 104, 106, 108, and 110 to cover at least the predicted distance. Further, the optimization module 302 may also be configured to ensure that the power to be provided to the vehicles 104, 106, 108, and 110 does not adversely affect the power requirements of other facilities at the warehouse. The optimization module 302 is also configured to modify the optimal power requirement plan based on real-time data pertaining to availability/absence of any of the vehicles 104, 106, 108, and 110 at the warehouse. Further, the optimal power requirement plan may also be refined based on energy storage mechanism estimations for each vehicle generated by the energy storage estimator 304 based on their arrival time at the site. The optimal power requirement plan is communicated to the controller 402 by the optimization module 302. The priority assignment module 404 in the controller 402 assigns charging priorities to the plurality of vehicles 104, 106, 108, and 110 based on comparison metrics determined for each vehicle 104, 106, 108, and 110. The scheduler 406 transmits charging commands to the charging stations 102 based on the optimal power requirement plan, and the priority assigned to each of the vehicles 104, 106, 108, and 110.

Various embodiments described above thus provide for a method and a system for charging electric vehicles. Optimal charging of vehicles provides for a cost efficient approach to operators to charge vehicles while at the same time ensure that power requirements of other facilities at the site of charging stations are met. Further, the optimal power requirement plan also reduces cost of charging the plurality of vehicles by utilizing predicted arrival times of vehicles and ensuring vehicles are charged when the cost of charging is at the lowest. Further, the system also reduces infrastructure costs to gather real time information pertaining to state of charge of the energy storage mechanisms by estimating this information through the energy storage estimator. The system also allows for operators to control the charging schedule and also accounts for changes made by the operators to the schedule to modify the optimal plan accordingly.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described method and system for charging electric vehicles, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A computer implemented method for controlling charging of a plurality of electric vehicles, the method comprising:
    determining predicted usage information for the plurality of electric vehicles based on past information for each vehicle in the plurality of vehicles, wherein the predicted usage information comprises a first total energy needed to be provided to the plurality of vehicles to reach a respective desired state of charge set point;
    optimizing power to be provided to the plurality of vehicles to generate an optimal power requirement plan, based on a first cost incurred to charge the plurality of vehicles with the first total energy, wherein generating the optimal power requirement plan comprises:
        determining a second amount of energy required by each of the plurality of vehicles to cover at least a predicted distance to be covered by each of the plurality of vehicles;
        iteratively adjusting a third amount of energy from the first total energy to be provided to each of the plurality of vehicles such that the third amount is greater than or equal to the second amount of energy and a second cost incurred to provide each of the plurality of vehicles with the third amount of energy is less than the first cost; and
    charging the plurality of vehicles through at least one charging station according to the optimal power requirement plan and a priority associated with each of the plurality of vehicles.

2. The method as recited in claim 1, wherein determining the predicted usage information comprises receiving input from an operator with respect to the past information for each vehicle from the plurality of vehicles.

3. The method as recited in claim 1 wherein the predicted usage information comprises at least one of energy consumed by each of the plurality of vehicles between a defined time period, state of charge of each of the plurality of vehicles after the defined time period, the distance to be covered by each of the plurality of vehicles, an average distance covered by each of the plurality of vehicles between the defined time period, a maximum distance covered by each of the plurality of vehicles between the defined time period, cost of power after the defined time period, a time that each of the plurality of vehicles is at the charging station, a total amount of time required to provide the first total energy to the plurality of vehicles, and an amount of power available with the charging station for charging the plurality of vehicles.

4. The method as recited in claim 1, wherein assigning the priority to each of the plurality of vehicles comprises:
    calculating a comparison metric between an amount of time required to charge the vehicle by the third amount of energy, and time available with the at least one charging station to charge the plurality of vehicles; and
    assigning a first priority to a vehicle with the highest comparison metric among the plurality of vehicles.

5. The method as recited in claim 4, wherein the comparison metric is a ratio of the time required to charge the vehicle by the third amount of energy and the time available with the at least one charging station to charge the plurality of vehicles.

6. The method as recited in claim 5 further comprises excluding vehicles with the comparison metric greater than 1 from assigning the priority.

7. The method as recited in claim 4, wherein the comparison metric is a difference between the time required to charge the vehicle by the third amount of energy and the time available with the at least one charging station to charge the plurality of vehicles.

8. The method as recited in claim 7 further comprises excluding vehicles with the comparison metric greater than 0 from assigning the priority.

9. The method as recited in claim 1, further comprising determining an estimated state of charge of each vehicle based on an energy storage model.

10. The method as recited in claim 9, further comprising updating the optimal power requirement plan based on the predicted usage information and the estimated state of charge of each vehicle.

11. The method as recited in claim 1, further comprising transmitting charging commands to the at least one charging station in accordance with the optimal power requirement plan.

12. A system to charge a plurality of vehicles, the system comprising:
at least one charging station to charge the plurality of vehicles by providing power; and
a processing sub-system communicably coupled to the charging station, wherein the processing sub-system further comprises:
a prediction module to generate predicted usage information for the plurality of electric vehicles based on past information for each vehicle in the plurality of vehicles, wherein the predicted usage information comprises a first total energy needed to be provided to the plurality of vehicles to reach a respective desired state of charge set point;
an optimization module to optimize the first total energy to be provided to the plurality of vehicles to generate an optimal power requirement plan, based on a first cost incurred to charge the plurality of vehicles by the first total energy, wherein the optimization module is configured to:
determine a second amount of energy required by each of the plurality of vehicles to cover a predicted distance to be covered by each of the plurality of vehicles;
iteratively adjust a third amount of energy to be provided to each of the plurality of vehicles such that the third amount is greater than or equal to the second amount of energy and a second cost incurred to provide each of the plurality of vehicles with the third amount of energy is less than the first cost; and
a controller to control a schedule of charging the plurality of vehicles based on the optimal power requirement plan and a priority associated with each of the plurality of vehicles.

13. The system as recited in claim 12 further comprises a user interface to provide past information to the prediction module to generate the predicted usage information.

14. The system as recited in claim 12 further comprises a weather data repository communicably coupled with the prediction module.

15. The system as recited in claim 12 further comprises power source information repository communicably coupled with the prediction module, wherein the power source information repository stores information related to a power source providing power to the at least one charging station.

16. The system as recited in claim 12, wherein the predicted usage information comprises at least one of energy consumed by each of the plurality of vehicles between a defined time period, state of charge of each of the plurality of vehicles after the defined time period, the distance to be covered by each of the plurality of vehicles, an average distance covered by each of the plurality of vehicles between the defined time period, a maximum distance covered by each of the plurality of vehicles between the defined time period, cost of power after the defined time period, a time that each of the plurality of vehicles is at the charging station, a total amount of time required to provide the first total energy to the plurality of vehicles, and an amount of power available with the charging station for charging the plurality of vehicles.

17. The system as recited in claim 12, wherein the controller further comprises a priority assignment module to assign priority of charging to each of the plurality of vehicles.

18. The system as recited in claim 17, wherein the priority assignment module is configured to:
calculate a comparison metric between an amount of time required to charge the vehicle by the third amount of energy, and time available with the at least one charging station to charge the plurality of vehicles; and
assign a first priority to a vehicle with the highest comparison metric among the plurality of vehicles.

19. The system as recited in claim 12, wherein the at least one charging station is configured to transmit actual arrival time of a vehicle from the plurality of vehicles, when the vehicle is connected to the at least one charging station.

20. The system as recited in claim 19, wherein the controller further comprises an energy storage estimator configured to estimate a current state of charge of the vehicle based on an energy storage mechanism model.

21. The system as recited in claim 20, wherein the optimization module is further configured to:
receive the estimated state of charge of the vehicle from the energy storage estimator; and
update the optimum power requirement plan for the vehicle according to the estimated state of charge.

22. The system as recited in claim 12, wherein the controller further comprises a scheduler configured to transmit charging commands to the at least one charging station in accordance with the optimal power requirement plan.

23. A non-transitory computer readable media embodying computer executable instructions, which when executed by a processor cause the computer to perform a method of optimally charging a plurality of vehicles, the computer readable media comprising:
program instructions to generate predicted usage information for each vehicle of the plurality of vehicles, wherein the predicted usage information is generated using past information for each of the plurality of vehicles, and the predicted usage information comprises a first total energy needed to be provided to the plurality of vehicles to reach a respective desired state of charge set point;
program instructions to optimize the first total power to be provided to the plurality of vehicles to generate an optimal power requirement plan, based on a first cost incurred to charge the plurality of vehicles by the first total energy, wherein program instructions to generate an optimal power requirement plan comprise:
program instructions to determine a second amount of energy required by each of the plurality of vehicles to cover a predicted distance to be covered by each of the plurality of vehicles;
program instructions to iteratively adjust a third amount of energy to be provided to each of the plurality of vehicles such that the third amount is greater than or equal to the second amount of energy and a second cost incurred to provide each of the plurality of vehicles with the third amount of energy is less than the first cost; and program instruction to control a schedule of charging the plurality of vehicles through at least one charging station according to the optimal power requirement plan and a priority associated with each of the plurality of vehicles.

24. A computer implemented method for controlling charging of a plurality of electric vehicles, the method comprising:

determining predicted usage information for the plurality of electric vehicles based on past information for each vehicle in the plurality of vehicles, wherein the predicted usage information comprises a first total energy needed to be provided to the plurality of vehicles to reach a respective desired state of charge set point and at least one of energy consumed by each of the plurality of vehicles between a defined time period, state of charge of each of the plurality of vehicles after the defined time period, the distance to be covered by each of the plurality of vehicles, an average distance covered by each of the plurality of vehicles between the defined time period, a maximum distance covered by each of the plurality of vehicles between the defined time period, cost of power after the defined time period, a time that each of the plurality of vehicles is at the charging station, a total amount of time required to provide the first total energy to the plurality of vehicles, and an amount of power available with the charging station for charging the plurality of vehicles;

optimizing power to be provided to the plurality of vehicles to generate an optimal power requirement plan, based on a first cost incurred to charge the plurality of vehicles with the first total energy; and charging the plurality of vehicles through at least one charging station according to the optimal power requirement plan and a priority associated with each of the plurality of vehicles.

* * * * *